No. 685,335. Patented Oct. 29, 1901.
L. N. LEGG.
BRICK TRUCK.
(Application filed Apr. 20, 1901.)
(No Model.) 2 Sheets—Sheet 1.
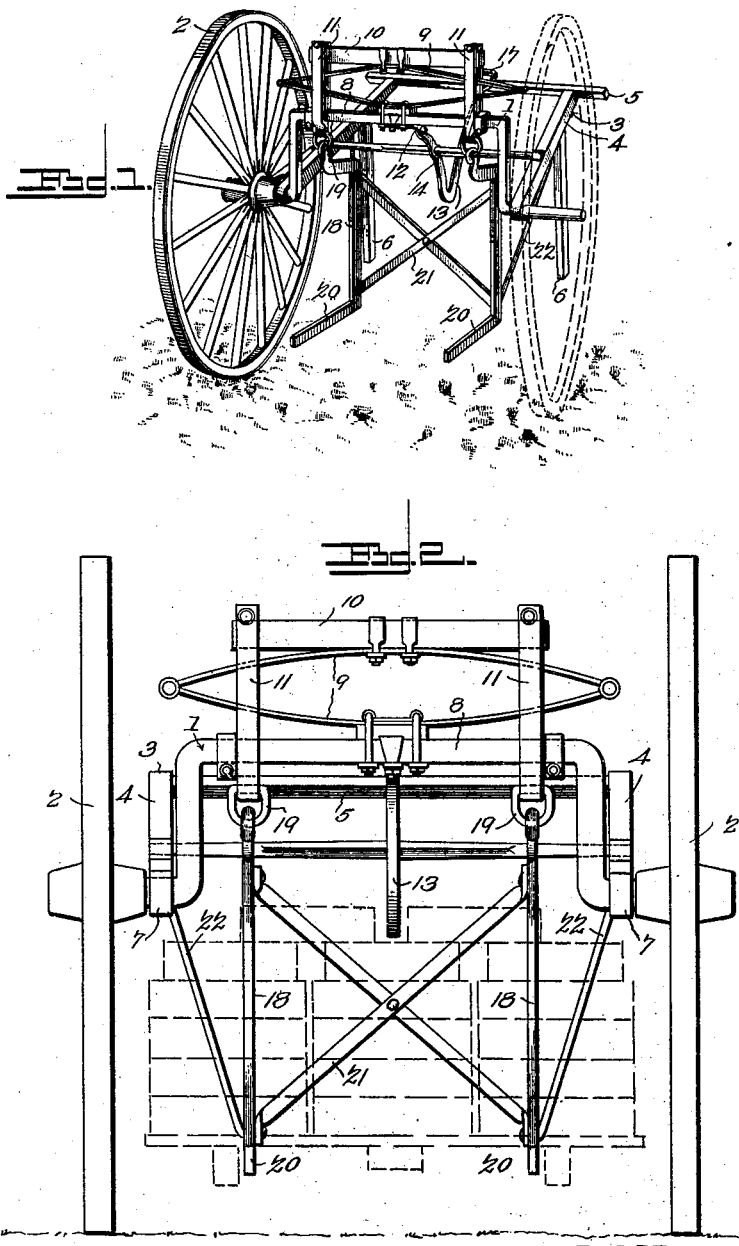
Witnesses
P. L. Stewart
J. W. Garner
L. N. Legg, Inventor
by C. A. Snow & Co.
Attorneys No. 685,335. Patented Oct. 29, 1901.
L. N. LEGG.
BRICK TRUCK.
(Application filed Apr. 20, 1901.)
(No Model.) 2 Sheets—Sheet 2.
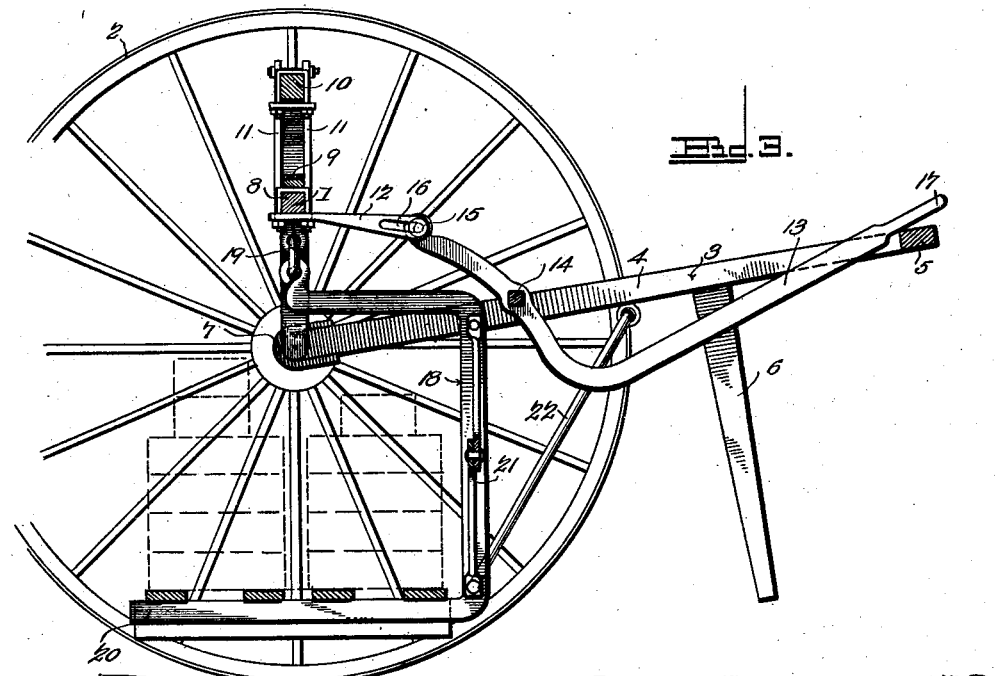
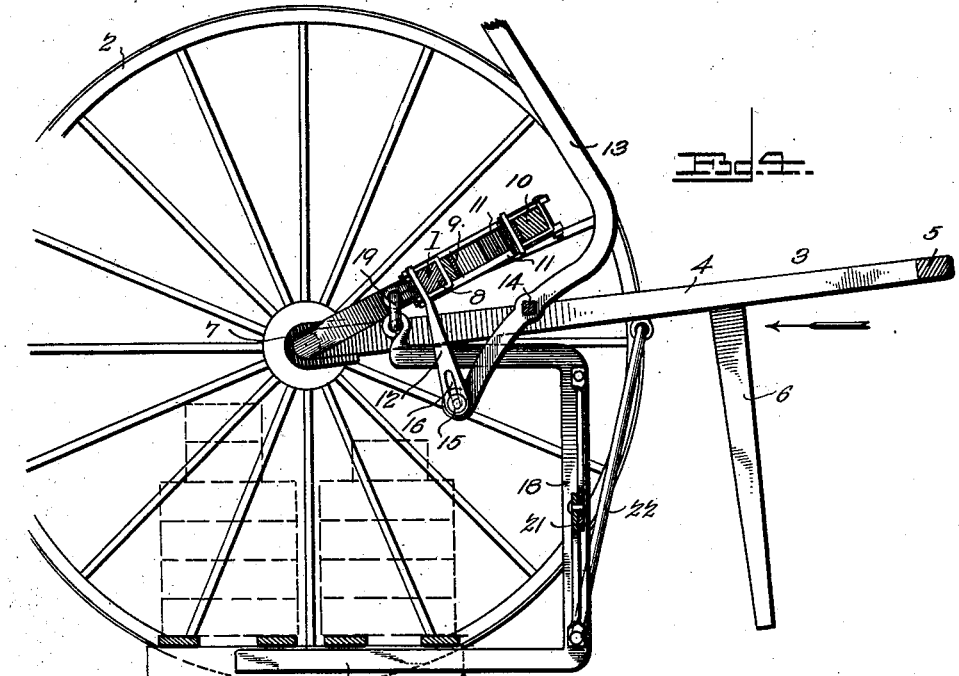
Witnesses L. N. Legg, Inventor
by
Attorneys

UNITED STATES PATENT OFFICE.

LAMBERT N. LEGG, OF CALHOUN, GEORGIA.

BRICK-TRUCK.

SPECIFICATION forming part of Letters Patent No. 685,335, dated October 29, 1901.

Application filed April 20, 1901. Serial No. 56,757. (No model.)

*To all whom it may concern:*

Be it known that I, LAMBERT N. LEGG, a citizen of the United States, residing at Calhoun, in the county of Gordon and State of Georgia, have invented a new and useful Brick-Truck, of which the following is a specification.

My invention is an improved brick-truck especially adapted for transporting bricks when piled on hacks from one place to another and thereby enabling the bricks to be moved without the necessity of repiling or handling the same; and it consists of the peculiar construction and combination of devices hereinafter fully set forth and claimed.

In the accompanying drawings, Figure 1 is a perspective view of a brick-truck constructed in accordance with my invention. Fig. 2 is a front elevation of the same. Fig. 3 is a vertical longitudinal sectional view of the same. Fig. 4 is a similar view of the same in another position.

In the embodiment of my invention I provide an arched axle 1, on the spindles of which are the supporting-wheels 2. A frame 3, which comprises the side bars 4, the connecting push-bar 5 between the rear ends of said side bars, and the supporting-legs 6, is pivotally connected to the arched axle near the spindles thereof, straps 7 being shown which connect the front ends of the bars 4 to the axle. On the arched portion 8 of the axle is secured an elliptic spring 9, on the upper side of which is a bolster 10. From the ends of the bolster depend links 11, which embrace the arch 8 of the axle and form guides, which, while permitting of the vertical movement of the bolster 10 by the action of the spring, brace the latter against lateral stress, as will be understood. A link 12 is secured under the center of the arched portion of the axle and projects rearwardly therefrom.

A lever 13 is fulcrumed between the side bars 4 of the push-frame, either as at 14 or in any other suitable manner, and the said lever is connected to the link 12 in such manner that lost motion is permitted between said lever and said link. In the drawings I show a pin or bolt 15, which connects the said lever to the said link and operates in a slot 16, with which the latter is provided; but this construction may be varied within the scope of my invention, and I do not limit myself in this particular. The long rearwardly-extending arm of said lever is provided with a handle 17, and the same when the lever is lowered to turn the cranked portion of the axle to an upright position, as shown in Fig. 3, bears on the push-bar 5, and hence the cranked axle is maintained by said lever in the said position.

A pair of carrying and lifting hooks 18 have their upper ends connected flexibly, as at 19, to the lower ends of the links 11. The said hooks are provided with horizontally-disposed lifting and carrying arms 20, which are adapted to be run under the bottom of a brick-hack, as shown, and to support the same and lift the same from the ground when the arched axle is turned to a vertical position. The said lifting and carrying hooks are connected together by braces 21, and to prevent the same from swinging they are connected to the bars 4 by rods 22. These rods 22 may, however, be omitted.

By turning the long arm of the lever 13 upward the said lever and the link 12 turn the cranked portion of the axle rearward, and thereby lower the same, and hence lower the lifting and carrying hooks, so that the latter may be run under and engaged with a brick-hack, as shown. The lever being then depressed to the position shown in Fig. 3, the cranked portion of the axle is turned to a vertical position, thereby raising the carrying and lifting hooks, and hence raising the hack, which may then be moved from place to place, as will be understood. The spring which I provide enables the hack to ride easily and prevents the same from being unduly jarred and jolted when the truck is in motion, and hence prevents the arrangement of the bricks on the hack from being disturbed.

Having thus described my invention, I claim—

1. In a brick-truck, the combination of an arched axle, supporting-wheels on the spindles thereof, a push-frame pivotally connected to said arched axle, a lever connected to said arched axle, to raise and lower the arched or cranked portion thereof, and a carrying element supported by said arched or cranked portion of said axle and adapted to be raised and lowered therewith, substantially as described.

2. In a brick-truck, the combination of an arched axle, supporting-wheels on the spindles thereof, a spring on the arched portion of said axle, a bolster on said spring, links depending from said bolster, a carrying element suspended by said links, a push-frame pivotally connected to said axle, and a lever connected to the arched portion of said axle, and adapted to raise and lower the same, substantially as described.

3. In a brick-truck, the combination of an arched axle, supporting-wheels on the spindles thereof, a spring on the arched portion of said axle, a bolster on said spring, links depending from said bolster and engaging the arched portion of the axle, a carrying element suspended by said links, a push-frame pivotally connected to said axle, and a lever fulcrumed to said push-frame and connected to the arched portion of said axle, to raise and lower the same, for the purpose set forth, substantially as described.

In testimony that I claim the foregoing as my own I have hereto affixed my signature in the presence of two witnesses.

LAMBERT N. LEGG.

Witnesses:
J. M. LANG,
T. W. HARBIN.